May 3, 1955 S. COSTOFF 2,707,329
DENTAL DEVICE FOR PREPARING TEETH TO RECEIVE CROWNS
Filed March 9, 1954 2 Sheets-Sheet 1
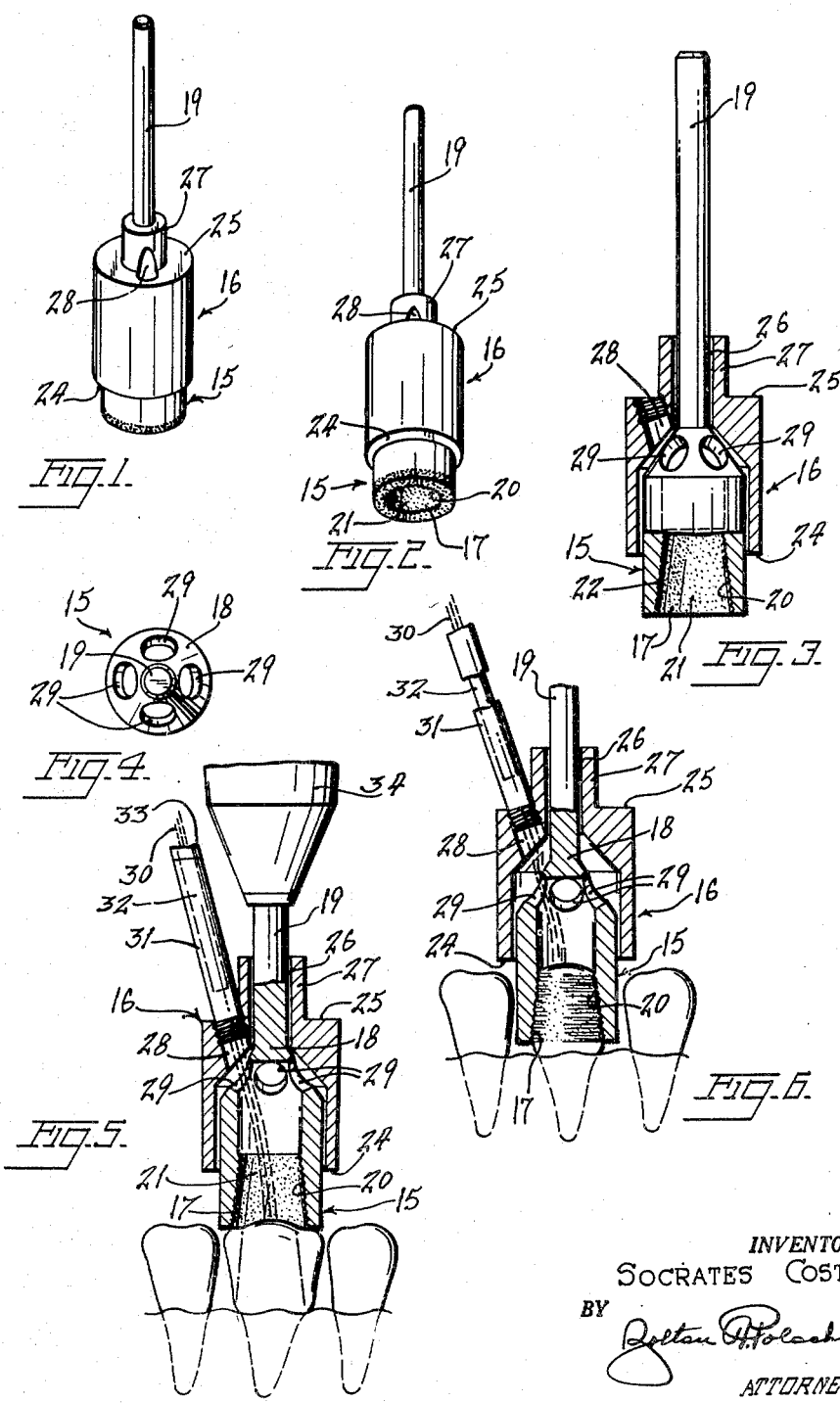
INVENTOR.
SOCRATES COSTOFF
BY
ATTORNEY

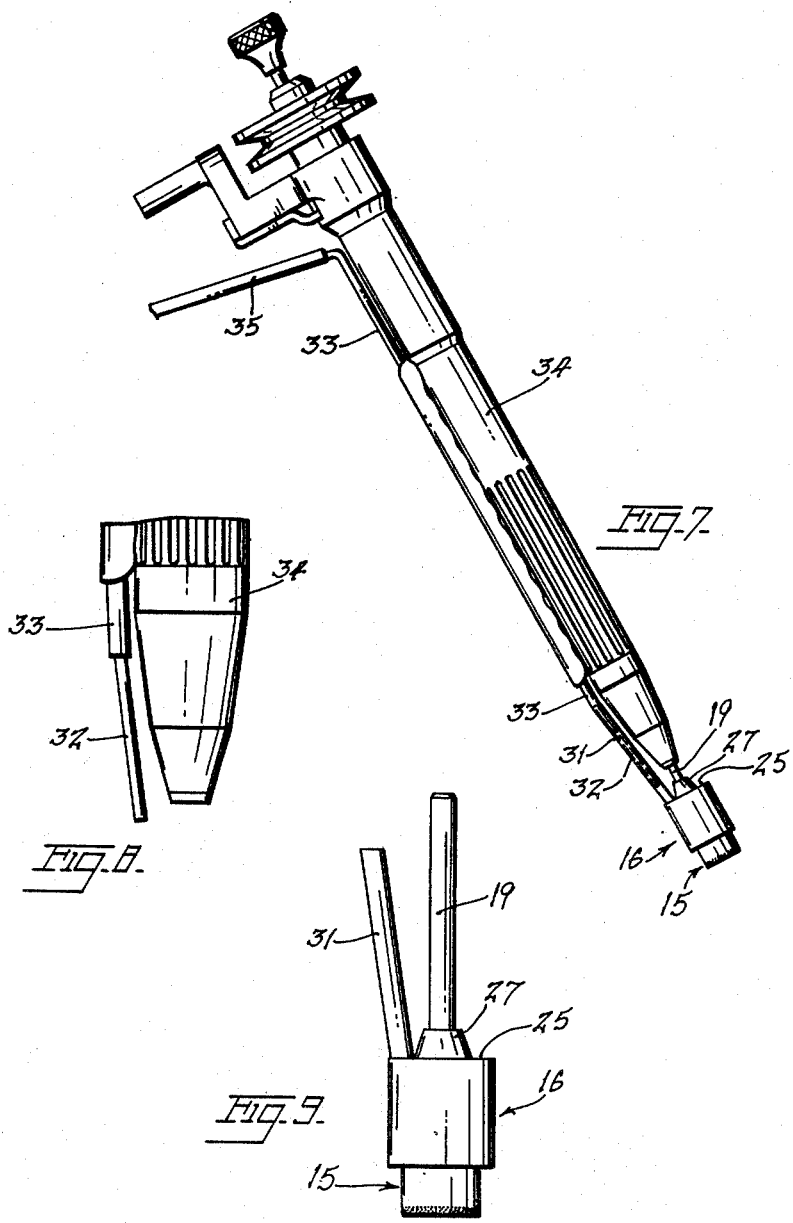

United States Patent Office 2,707,329
Patented May 3, 1955

2,707,329

DENTAL DEVICE FOR PREPARING TEETH TO RECEIVE CROWNS

Socrates Costoff, New York, N. Y.

Application March 9, 1954, Serial No. 414,925

6 Claims. (Cl. 32—48)

This invention relates to new and useful improvements in dental instruments.

More particularly, the present invention proposes the construction of structure which can be used for the preparation of porcelain crowns, veneer crowns, full crowns, and any other preparation where convex and uniform grinding of tooth enamel is required without causing any undercuts and without injuring the soft tissue and the adjoining teeth.

Another object of the present invention proposes forming a hollow cylindrical grinding attachment or instrument having a conical shape gingival cutting circumference corresponding with and adapted properly to grind down into crown receiving shape a particular type of tooth such as lateral, central, bicuspid and molar.

Still further, the present invention proposes constructing the hollow dental abrasive instrument so that a stream of water or water and compressed air can be admitted to the inside of the hollow cylinder and to the frustoconical grinding surface therein to cool and clean the instrument while it is operating. In the dental profession, diamond stones have been used successfully as an abrasive in all kinds of preparations but because good results are obtained by operating abrasive instruments at about $\frac{1}{60000}$ revolutions per minute, great heat has been developed which heretofore could not escape from the cutting surface toward the middle of the body of the dental instrument. External cooling has been done by water but has proven insufficient and objectionable as pathological changes may be caused in the tooth nerve. The present invention proposes to obviate these cooling problems and at the same time to provide more effective means for cleaning the cutting surface.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of the structure of the present invention.

Fig. 2 is a view similar to Fig. 1 but viewing the structure from a different angle.

Fig. 3 is a vertical sectional view of the structure shown in Figs. 1 and 2 with parts broken away and in section.

Fig. 4 is a top plan view of the structure with the jacket removed.

Fig. 5 is a side view of the instrument with parts broken away and in section and of three teeth, the instrument being in position to grind one tooth to the dot-dash outline shown.

Fig. 6 is a view similar to Fig. 5 but showing the final stage of the cutting operation.

Fig. 7 is a side view of a drill with the structure of the present invention fastened thereto.

Fig. 8 is an enlarged view of a portion of Fig. 7 with the lower end piece removed.

Fig. 9 is a view similar to Fig. 8 of the lower end piece.

Referring more particularly to the drawings, the attachment or instrument has a hollow cylinder 15 and a sleeve jacket 16.

Cylinder 15 has one open end 17 and a closed end 18. A shaft shank 19 extends from the closed end 18 for rotating the cylinder 15. The cylinder has a frustoconical inner surface 20 tapering from the open end 17 and converging toward the closed end 18 and shank 19. The surface 20 corresponds to the ground-down shape of a particular type tooth which has been properly prepared as a conical stump for a crown.

Abrasive matter in the form of diamond stones 21 are secured by electro plating at 22 (or any other conventional way) inside the cylinder 15 to the inner surface 20 adjacent the open end 17 of the cylinder. All the abrasive matter 21 is thus disposed inside the cylinder and the end surface 23 of the cylinder 15 is smooth.

Sleeve jacket 16 is adapted to be stationary and rotatably to hold the cylinder 15. Jacket 16 has an open end 24 and a closed end 25 with an axial opening 26 through the closed end 25 rotatably to receive the shaft or shank 19 of cylinder 15. A turned down portion 27 at the closed end 25 of the jacket 16 is adapted to fit in the stationary jaws of any drill or other instrument to hold the jacket stationary.

Jacket 16 has a fluid opening 28 in it at its closed end 25. Cylinder 15 is rotatably mountable in the jacket 16 with the open end 17 of the cylinder disposed out of and extending from the open end 24 of the jacket. The closed end 18 of the cylinder is provided with spaced openings 29 which are disposed in alignment with the fluid opening 28 in the jacket to connect the fluid opening 28 with the inside of the cylinder. The spaced fluid openings 29 are of a size and are spaced to admit a predetermined amount of fluid, water or water and compressed air to the inside of the cylinder as it is rotated at a given speed. The spaced openings 29 intermittently connect fluid opening 28 of the jacket with the inside of the cylinder so that fluid is admitted in broken streams. The fluid 30 enters the opening 28 of the jacket through a conduit 31 connected thereto.

The conduit 31 preferably is a short length of tubing secured by threads or otherwise to the jacket in the fluid opening 28. Conduit 31 is adapted to receive a bayonet or male connecting tube 32 of smaller diameter and extending from a tube 33 of the same diameter as conduit 31. The tube 33 is fixed to the side of a drill 34 as by welding, soldering, and the like and a flexible hose 35 can be connected to the upper end of the tube 33. This telescoping arrangement of the conduit 31 and tubes 32 and 33 permits the sleeve to be replaced.

It will thus be seen that this instrument can be used to prepare a tooth by a simplified operation by cutting a convex surface without injuring the soft gum tissue or the adjoining teeth (see Figs. 5 and 6), and at the same time will keep the tooth clean and cool. The instrument will not produce any undercuts because the diamonds are on the inner surface and because of the inner conical shape with the large circumference toward the tooth. This is one of the important features for a good impression and for avoiding distortions.

In the instrument of this invention, cooling takes place simultaneously on two surfaces; the surface between the two structures and the diamond abrasive dust and cooling from within the instrument itself. In this manner, it will not be possible to raise the temperature but a few degrees above that of the water supplied. The shell of the instrument can be delicately made to facilitate cooling by the fluid injected thereinto.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:

1. In a dental instrument, a hollow cylinder having one open end and one closed end with a shank extending from the closed end for rotating the cylinder, said cylinder having a frustoconical inner surface tapering from said open end and converging toward said closed end corresponding to the ground-down shape of a particular type tooth prepared for a crown, abrasive matter inside the cylinder secured to said inner surface and adjacent said open end of the cylinder, and means to admit fluid inside the cylinder at the closed end thereof, said means being a stationary sleeve jacket adapted rotatably to receive the closed end portion of the cylinder, said jacket having a fluid opening therein connected with the closed end of the cylinder and spaced openings in the cylinder at the closed end of the cylinder aligned with the fluid opening in the jacket to connect said fluid opening with the inside of the cylinder.

2. In a dental instrument, a hollow cylinder having one open end and one closed end with a shank extending from the closed end for rotating the cylinder, said cylinder having a frustoconical inner surface tapering from said open end and converging toward said closed end corresponding to the ground-down shape of a particular type tooth prepared for a crown, abrasive matter inside the cylinder secured to said inner surface and adjacent said open end of the cylinder, and means to admit fluid inside the cylinder at the closed end thereof, having a fluid opening therein, a tube extending from said opening, a second tube secured to the side of the dental instrument for alignment with the other tube, one of said tubes having a male portion telescopically and removably to fit into the other tube and spaced openings in the cylinder at the closed end of the cylinder aligned with the fluid opening in the jacket to connect said fluid opening with the inside of the cylinder.

3. In a dental instrument, a hollow cylinder having one open end and one closed end with a shank extending from the closed end for rotating the cylinder, said cylinder having a frustoconical inner surface tapering from said open end and converging toward said closed end corresponding to the ground-down shape of a particular type tooth prepared for a crown, abrasive matter inside the cylinder secured to said inner surface and adjacent said open end of the cylinder, and means to admit fluid inside the cylinder at the closed end thereof, said means being a stationary sleeve jacket adapted rotatably to receive the closed end portion of the cylinder, said jacket having a fluid opening therein connected with the closed end of the cylinder and spaced openings in the cylinder at the closed end of the cylinder aligned with the fluid opening in the jacket to connect said fluid opening with the inside of the cylinder, said openings in the cylinder being of a predetermined size and spaced to admit a predetermined flow of water to the inside of the cylinder to cool the cylinder as it is rotated at a predetermined speed.

4. In a dental instrument, a hollow cylinder having one open end and one closed end with a shank extending from the closed end for rotating the cylinder, said cylinder having a frustoconical inner surface tapering from said open end and converging toward said closed end corresponding to the ground-down shape of a particular type tooth prepared for a crown, abrasive matter inside the cylinder secured to said inner surface and adjacent said open end of the cylinder, and means to admit fluid inside the cylinder at the closed end thereof, said means being a stationary sleeve jacket adapted rotatably to receive the closed end portion of the cylinder, said jacket having a fluid opening therein connected with the closed end of the cylinder and spaced openings in the cylinder at the closed end of the cylinder aligned with the fluid opening in the jacket to connect said fluid opening with the inside of the cylinder, said openings in the cylinder being of predetermined size and spaced to admit a predetermined flow of water and compressed air to the inside of the cylinder to cool and clean it as the cylinder is rotated at a predetemined speed.

5. In a dental instrument, a hollow stationary sleeve jacket having an open end and a closed end with an axial shaft opening therethrough, a fluid opening in the jacket at the closed end thereof, a hollow cylinder rotatably mounted in the jacket, said cylinder having an open end disposed out of and extending beyond the open end of the jacket and a closed end disposed in the jacket adjacent the closed end of the jacket, a shank shaft extending from the closed end of the jacket rotatably through the axial shaft opening in the jacket, said cylinder having a frustoconical inner surface tapering from the open end of the cylinder and converging toward the closed end thereof, and abrasive matter secured inside the cylinder to said inner surface adjacent the open end of the cylinder, said cylinder having a fluid opening at its closed end disposed intermittently to connect the fluid opening in said jacket with the inside of the cylinder.

6. In a dental instrument, a hollow stationary sleeve jacket having an open end and a closed end with an axial shaft opening therethrough, a fluid opening in the jacket at the closed end thereof, a hollow cylinder rotatably mounted in the jacket, said cylinder having an open end disposed out of and extending beyond the open end of the jacket and a closed end disposed in the jacket adjacent the closed end of the jacket, a shank shaft extending from the closed end of the jacket rotatably through the axial shaft opening in the jacket, said cylinder having a frustoconical inner surface tapering from the open end of the cylinder and converging toward the closed end thereof, and abrasive matter secured inside the cylinder to said inner surface adjacent the open end of the cylinder, said cylinder having a plurality of spaced fluid openings at its closed end disposed intermittently to connect the fluid opening in said jacket with the inside of the cylinder.

References Cited in the file of this patent

UNITED STATES PATENTS

| | | |
|---|---|---|
| 704,428 | Allen | July 8, 1902 |
| 2,250,058 | Brooks | July 22, 1941 |